(12) United States Patent
Lalor et al.

(10) Patent No.: US 10,818,295 B1
(45) Date of Patent: Oct. 27, 2020

(54) MAINTAINING NETWORK CONNECTIONS

(71) Applicant: Sorenson IP Holdings, LLC, Salt Lake City, UT (US)

(72) Inventors: Christian Lalor, Murray, UT (US); Michael Holm, Bountiful, UT (US); Michael Stimpson, Taylorsville, UT (US); Brian Chevrier, Highland, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 16/502,994

(22) Filed: Jul. 3, 2019

(51) Int. Cl.
| | |
|---|---|
| *G10L 15/26* | (2006.01) |
| *G10L 15/22* | (2006.01) |
| *H04W 76/10* | (2018.01) |
| *H04W 76/30* | (2018.01) |
| *G06F 40/10* | (2020.01) |
| *G06F 40/279* | (2020.01) |

(52) U.S. Cl.
CPC ............ *G10L 15/265* (2013.01); *G06F 40/10* (2020.01); *G06F 40/279* (2020.01); *G10L 15/22* (2013.01); *H04W 76/10* (2018.02); *H04W 76/30* (2018.02); *G10L 2015/223* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,136,478 B1* | 11/2006 | Brand | .................... | H04M 3/493 379/265.09 |
| 9,917,939 B1* | 3/2018 | Stimpson | ............ | H04M 1/6505 |
| 10,224,057 B1* | 3/2019 | Chevrier | ........... | H04M 3/42391 |
| 10,573,312 B1* | 2/2020 | Thomson | ................ | G10L 15/26 |
| 2002/0168987 A1* | 11/2002 | Wang | .................... | H04M 3/436 455/456.1 |
| 2003/0110211 A1* | 6/2003 | Danon | .................... | H04L 67/42 709/203 |
| 2011/0045804 A1* | 2/2011 | Self | ......................... | G10L 15/26 455/413 |
| 2015/0215465 A1* | 7/2015 | Lee | ........................ | H04M 3/54 455/417 |

(Continued)

*Primary Examiner* — Akelaw Teshale
(74) *Attorney, Agent, or Firm* — Maschoff Brennan (57) ABSTRACT

A method may include obtaining, at a device, a first input that results in audio playback of a first stored message and establishing a network connection between the device and a remote transcription system. The method may include directing audio of the first stored message to the remote transcription system and obtaining transcriptions of the audio from the remote transcription system during playback of the first stored message. The method may include maintaining the network connection after playback of the first stored message and obtaining a second input that results in audio playback of a second stored message. The method may include directing audio of the second stored message to the remote transcription system and obtaining transcriptions of the audio from the remote transcription system during playback of the second stored message. The method may include obtaining an indication to terminate the network connection and terminating the network connection.

20 Claims, 5 Drawing Sheets

(56) References Cited

U.S. PATENT DOCUMENTS

| | | | |
|---|---|---|---|
| 2015/0350443 A1* | 12/2015 | Kumar | H04M 3/5183 |
| | | | 379/265.13 |
| 2017/0085506 A1* | 3/2017 | Gordon | H04L 51/046 |
| 2017/0201478 A1* | 7/2017 | Joyce | H04L 67/42 |
| 2017/0201613 A1* | 7/2017 | Engelke | G10L 15/06 |
| 2017/0251031 A1* | 8/2017 | Lehesaari | H04L 65/10 |
| 2017/0264735 A1* | 9/2017 | Terra Rios | H04W 4/16 |
| 2018/0270350 A1* | 9/2018 | Engelke | G10L 15/265 |
| 2019/0357109 A1* | 11/2019 | Hong | H04W 76/19 |

\* cited by examiner

MAINTAINING NETWORK CONNECTIONS

FIELD

The embodiments discussed herein are related to maintaining network connections.

BACKGROUND

Modern telecommunication services provide features to assist those who are deaf or hearing-impaired. One such feature is a text captioned telephone system for the hearing-impaired. A text captioned telephone system may include a telecommunication intermediary service that is intended to permit a hearing-impaired user to utilize a normal telephone network.

The subject matter claimed herein is not limited to embodiments that solve any disadvantages or that operate only in environments such as those described above. Rather, this background is only provided to illustrate one example technology area where some embodiments described herein may be practiced.

SUMMARY

A method may include obtaining, at a device, a first input that results in audio playback of a first stored message of a plurality of stored messages. The method may also include establishing a network connection between the device and a remote transcription system in response to obtaining the first input. The remote transcription system may be configured to generate transcriptions of the plurality of stored messages. The method may further include directing, from the device, audio of the first stored message to the remote transcription system over the network connection during playback of the first stored message. The method may also include obtaining, at the device, transcriptions of the audio of the first stored message from the remote transcription system over the network connection during playback of the first stored message. The method may further include maintaining the network connection with the remote transcription system after playback of the first stored message. The method may also include obtaining, at the device, a second input that results in audio playback of a second stored message of the plurality of stored messages. The method may further include directing, from the device, audio of the second stored message to the remote transcription system over the network connection during playback of the second stored message. The method may also include obtaining, at the device, transcriptions of the audio of the second stored message from the remote transcription system over the network connection during playback of the second stored message. The method may further include obtaining an indication to terminate the network connection with the remote transcription system. The method may also include terminating the network connection with the remote transcription system in response to obtaining the indication to terminate the network connection.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to a method and/or system that may maintain network connections between a device and a remote transcription system. In these and other embodiments, the remote transcription system may obtain transcriptions of communication sessions between the device and other devices and/or messages stored on the device and direct the transcriptions to the device. In these and other embodiments, transcriptions may include the text of the words spoken by one or more parties in a communication session and/or a message. Network connections may be terminated as a user of the device selects different stored messages to play. For example, a network connection may be established between the device and the remote transcription system to obtain transcriptions of a first stored message. After playback of the first stored message, the network connection may be terminated. Another network connection may be established between the device and the remote transcription system to obtain transcriptions of a second stored message. The remote transcription system may obtain transcriptions of audio associated with each message associated with the device but may do so in an inefficient manner by repeatedly establishing and terminating network connections.

Some embodiments in this disclosure describe a system that may be configured to maintain network connections. In some embodiments, maintaining network connections may include establishing a network connection in response to receiving a request to play back a message associated with a device. For example, a device may include a storage with multiple stored audio and/or video messages. The device may receive a selection of a particular stored message for playback. In response to receiving the selection of the message for playback, the device may establish a network connection with a remote transcription system. The network connection may include a Transmission Control Protocol (TCP) network connection. The device may direct audio of the message to the remote transcription system and the remote transcription system may send transcriptions of the audio to the device via the network connection. After playback of the message is completed, the network connection may be maintained until an indication to terminate the connection is obtained. For example, in some embodiments, the indication to terminate the connection may include the device receiving input navigating away from a menu including a list of messages, the device being idle for a period of time, and/or a handset of the device being picked up. Alternatively or additionally, in some embodiments, the indication to terminate the connection may include the device establishing a second network connection with a second device. The second network connection may be a different type of network connection than the first network connection. For example, the second network connection may be a plain old telephone system (POTS) connection. Alternatively or additionally, in some embodiments, the indication to terminate the connection may include the device terminating a second network connection with a second device.

In some embodiments, the systems and/or methods described in this disclosure may thus help to more efficiently manage network connections and may help to improve transcribing communication sessions by reducing delay in establishing network connections. For example, in some embodiments, maintaining network connections, such as the TCP network connections, may reduce the time to obtain transcriptions from the remote transcription system. Additionally, in some embodiments, maintaining network connections, such as the TCP network connections, may reduce the number of dropped connections or failed network requests by reducing the number of such connections or network requests. Thus, the systems and/or methods described in this disclosure may provide at least a technical solution to a technical problem associated with the transcription of communication sessions in the technology of telecommunications.

Figure 1:
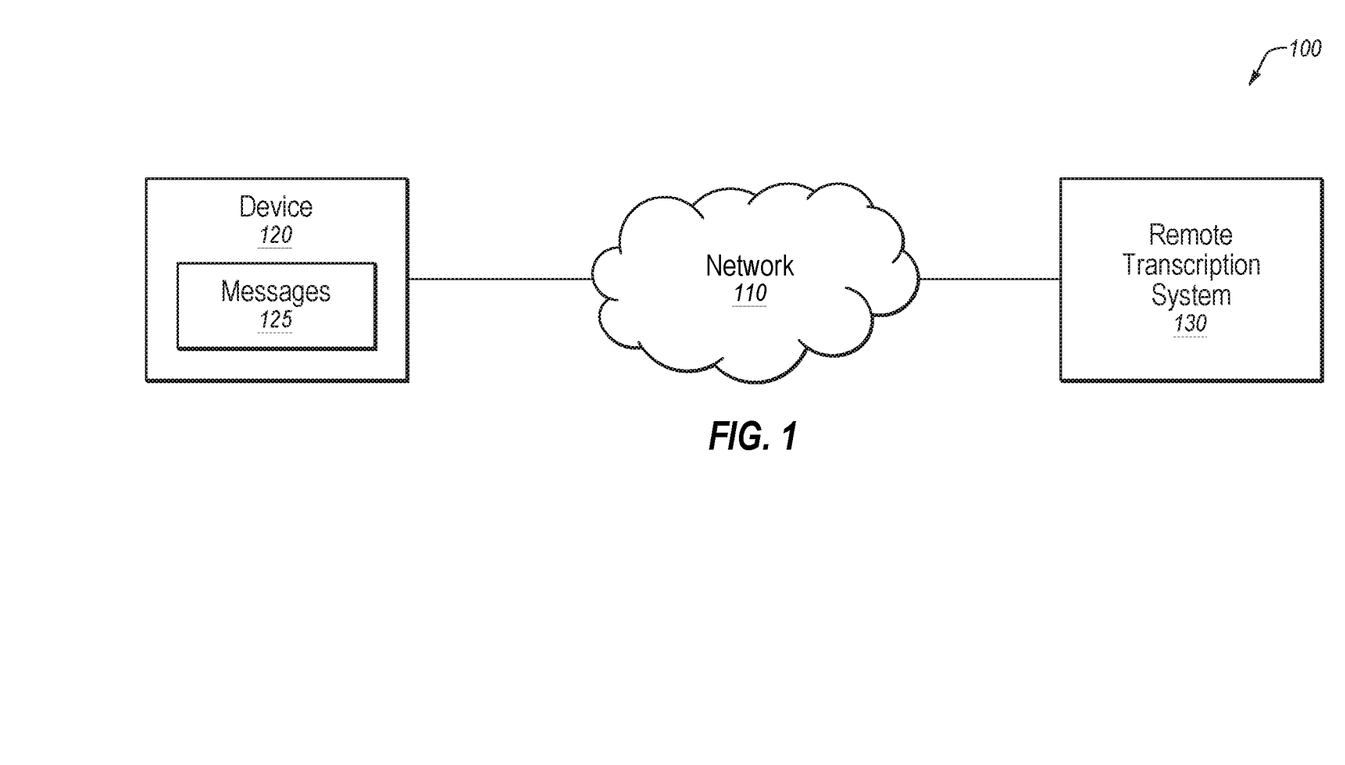
FIG. 1 illustrates an example environment to maintain network connections.

FIG. 1 illustrates an example environment 100 to maintain network connections. The environment 100 may be arranged in accordance with at least one embodiment described in the present disclosure. The environment 100 may include a network 110, a device 120, and a remote transcription system 130.

The network 110 may be configured to communicatively couple the device 120 and the remote transcription system 130. In some embodiments, the network 110 may be any network or configuration of networks configured to send and receive communications between systems and devices. In some embodiments, the network 110 may include a wired network or wireless network, and may have numerous different configurations. In some embodiments, the network 110 may also be coupled to or may include portions of a telecommunications network, including wireless telecommunications, voice over internet protocol networks, and telephone lines such as a public switch telephone network (PSTN) line, for sending data in a variety of different communication protocols, such as a protocol used by a plain old telephone system (POTS), cellular and data networks, such as long-term evolution (LTE) networks and 5G networks, among other protocols. In some embodiments, the network 110 may also couple devices using data networking protocols such as the Transmission Control Protocol (TCP), the Stream Control Transmission Protocol (SCTP), the User Datagram Protocol (UDP), the UDP-based Data Transfer Protocol (UTP), among other protocols.

The device 120 may be any electronic or digital computing device. For example, the device 120 may include a desktop computer, a laptop computer, a smartphone, a mobile phone, a tablet computer, a telephone, a phone console, or any other computing device. In some embodiments, the device 120 may be a captioning telephone that is configured to present transcriptions of a communication session, such as one of the CaptionCall® 57T model family or 67T model family of captioning telephones or a device running the CaptionCall® mobile app. For example, in some embodiments, the device 120 may include a visual display that is integral with the device 120 and that is configured to present text transcriptions of a communication session.

In some embodiments, the device 120 may be configured to establish communication sessions with other devices. For example, the device 120 may be configured to establish an outgoing audio or video call with another device. For example, the audio call may be a telephone call over a wireless cellular network, a wired Ethernet network, an optical network, or a POTS line. For example, during an audio or video call between the device 120 and a third-party device, the device 120 may communicate over a wireless cellular network and the third-party device may communicate over a PSTN line. Alternatively or additionally, the device 120 may communicate over other wired or wireless networks that do not include or only partially include PSTN service. For example, a telephone call or communication session between the device 120 and a third-party device may be a Voice over Internet Protocol (VoIP) telephone call.

In some embodiments, the device 120 may be configured to obtain audio during a communication session. The audio may be part of a video communication or an audio communication. As used in this disclosure, the term audio may be used generically to refer to sounds that may include spoken words. Furthermore, the term audio may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the device 120 may be configured to obtain audio from a user of the device 120. In some embodiments, the user of the device 120 may be a hearing-impaired user. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others. Alternatively or additionally, in some embodiments, the user of the device 120 may not be a hearing-impaired user.

The audio may include speech of the user of the device 120. The speech of the user may be words spoken by the user. For example, the device 120 may obtain speech of the user from a microphone of the device 120 or from another device that is communicatively coupled to the device 120. During a communication session, the device 120 may provide the audio obtained by the device 120 to a third-party device and may obtain audio from the third-party device. The third-party device may obtain the audio to direct to the device 120 in a manner analogous to how the device 120 may obtain audio from the user of the device 120.

Alternatively or additionally, in some embodiments, the device 120 may store one or more messages 125. The messages 125 may include audio messages, video messages, or other messages. The messages 125 may include audio which may include speech of one or more individuals. In some embodiments, the messages 125 may be of relatively short duration. For example, in some embodiments, the messages 125 may range in length from a few seconds to many minutes in length. In some embodiments, the messages 125 may be stored locally on a storage of the device 120. Alternatively or additionally, in some embodiments, the messages 125 may be stored on a storage accessible to the device 120 via the network 110 such as, for example, a cloud storage. Alternatively or additionally, in some embodiments, the messages 125 may be stored locally on a storage of the device 120 and may also be stored on a cloud storage or other network-accessible storage device. The messages 125 may be stored on the device 120 in any file format such as, for example, .mp3, .m4a, .wav, .wma, mov, .avi, .wmv, .mp4, and .mpg.

In some embodiments, the messages 125 may be obtained by the device 120 in response to receiving a communication request from a third-party device. For example, in some embodiments, a third-party device may attempt to establish a communication session with the device 120. In response to not establishing a communication session with the device 120, the device 120 may obtain audio from a user of the third-party device via the third-party device and may store the audio. For example, a user of the third-party device may attempt to place a phone call to the device 120 but may be unsuccessful because the device 120 may be switched off, a user of the device 120 may not answer the call, or the user of the device 120 may reject the call, among other reasons. The audio from the third-party device may be stored as a "message" or a voicemail. Alternatively or additionally, in some embodiments, the device 120 may obtain one or more of the messages 125 as a dedicated message (i.e., the message may be obtained from a third-party device not in response to an attempted communication session such as, for example, an attachment to an email or a voice message).

The device 120 may be configured to provide the audio from the device 120, audio from a third-party device, or both audio from the device 120 and audio from the third-party device to the remote transcription system 130. In some embodiments, the device 120 may be configured to provide audio associated with one or more of the messages 125 to the remote transcription system 130.

In some embodiments, the remote transcription system 130 may be configured to obtain a transcription of audio received from the device 120. The remote transcription system 130 may also provide the transcription of the audio to the device 120.

The device 120 may be configured to present the transcription received from the remote transcription system 130. For example, the device 120 may be configured to display the received transcriptions on a display that is part of the device 120 or that is communicatively coupled to the device 120.

In some embodiments, the remote transcription system 130 may include a speech recognition system. The speech recognition system may be configured to generate transcriptions from audio. In these and other embodiments, the speech recognition system may include any configuration of hardware, such as processors, servers, and database servers that are networked together and configured to perform a task. For example, the speech recognition system may include one or multiple computing systems, such as multiple servers that each include memory and at least one processor. Alternately or additionally, the speech recognition system may be separate from the remote transcription system 130 and may provide the transcriptions to the remote transcription system 130.

In some embodiments, the speech recognition system may be an automatic system that automatically recognizes speech independent of human interaction to generate the transcription. In these and other embodiments, the speech recognition system may include speech engines that are trained to recognize speech. The speech engine may be trained for general speech and not specifically trained using speech patterns of the participants in the communication session. Alternatively or additionally, the speech engine may be specifically trained using speech patterns of one or more of the participants of the communication session.

Alternatively or additionally, the speech recognition system may be a re-voicing system. In these and other embodiments, the speech recognition system may broadcast the audio and obtain a re-voicing of the audio as re-voiced audio. In these and other embodiments, a person may listen to the broadcast audio and re-speak the words of the audio. The re-spoken words may be the re-voiced audio. The speech recognition system may provide the re-voiced audio to a speech engine that is trained for the person doing the re-voicing. The speech engine may generate the transcription.

In these and other embodiments, the speech recognition system may be configured to recognize speech in the audio. Based on the recognized speech, the speech recognition system may generate the transcription of the speech. The transcription may be a written version of the speech in the audio. The remote transcription system 130 may provide the transcription of the speech to the device 120.

In some embodiments, the speech recognition system may be configured to receive the audio in real-time or substantially real-time. In these and other embodiments, the speech recognition system may be configured to generate the transcription in real-time or substantially real-time. In these and other embodiments, substantially real-time may indicate a time that is less than 2, 4, 6, 8, or 10 seconds or real-time.

In some embodiments, the device 120 and/or the remote transcription system 130 may be configured to maintain network connections between the device 120 and the remote transcription system 130. For example, in some embodiments, the device 120 may request that a network connection be established between the device 120 and the remote transcription system 130. In some embodiments, the network connection between the device 120 and the remote transcription system 130 may be a TCP network connection. In some embodiments, it may take several seconds from when a network connection is requested before the remote transcription system 130 is ready to direct transcriptions to the device 120 via the network connection.

In some embodiments, the device 120 may establish a connection with the remote transcription system 130 to obtain transcriptions of audio associated with one or more of the messages 125. For example, a user of the device 120 may select to play back a message. In response to receiving the selection to play back the message, the device 120 may establish a network connection with the remote transcription system 130. Audio and/or video of the message may be played back on the device 120. While the audio and/or video of the message are played back on the device 120, the device 120 may concurrently direct the audio of the message to the remote transcription system 130 over the network connection. The remote transcription system 130 may obtain transcriptions of the audio of the message as described above and may direct the transcriptions to the device 120 over the network connection. The device 120 may present the transcription along with the playback of the audio and/or video.

After playback of the message has completed, the network connection between the device 120 and the remote transcription system 130 may be maintained rather than being terminated. For example, in the re-voicing system described above, the person who is listening to the broadcast audio and re-speaking may remain connected to the device 120 through a call assistant device (not illustrated in FIG. 1) after completion of the playback of the message. In some embodiments, the call assistant device may be a Session Border Controller (SBC). Alternatively or additionally, in some embodiments, the call assistant device may be any device that may enable the person who is listening to the broadcast audio to hear the audio and re-speak the audio. During this time period, the person may not listen to audio and may not re-speak any words. Rather, the person may wait until the user of the device 120 selects an additional message for playback or takes some other action. The user of the device 120 may then select to play back a second message. Audio and/or video of the second message may be played back on the device 120. As before, while audio and/or video of the second message are played back, the device 120 may concurrently direct audio of the second message to the remote transcription system 130 over the network connection and the remote transcription system 130 may obtain transcriptions of the audio and direct the transcriptions to the device 120. The device 120 may present the transcription along with the playback of the audio and/or video.

In some embodiments, the network connection may be maintained between the device 120 and the remote transcription system 130 until the device 120 and/or the remote transcription system 130 obtains an indication to terminate the network connection. In some embodiments, the indication to terminate the network connection may be obtained at any time. For example, the indication to terminate the network connection may be obtained during playback of a message, prior to the completion of playback of a message, or prior to the completion of the transcribing of the message, or at other times. In these and other embodiments, the network connection may similarly be terminated during playback of a message, prior to the completion of playback of a message, or prior to the completion of the transcribing of the message, or at other times.

In some embodiments, the indication to terminate the network connection may include a menu selection at the device 120 navigating to a different menu than a stored message playback menu. For example, the messages associated with the device 120 may be presented as a list in a menu, as described below with reference to FIG. 2. A user of the device 120 may select, using the device 120, to exit from the list of messages. The selection to exit from the list of messages may be an indication to terminate the network connection between the device 120 and the remote transcription system 130.

Alternatively or additionally, in some embodiments, the indication to terminate the network connection may include a notification that a handset of the device 120 has been picked up. For example, in some embodiments, the device 120 may include a handset similar to a traditional telephone handset. The handset may include a speaker and a microphone through which a user of the device 120 may participate in communication sessions. In some embodiments, picking up the handset of the device 120 may result in the acceptance of a request to initiate a communication session received from a third-party device. For example, when the device 120 receives a request to establish a communication session, the device 120 may play an audio sound such as a ringtone. To accept the request, a user of the device 120 may pick up the handset of the device 120. Alternatively or additionally, in some embodiments, picking up the handset of the device 120 may result in playback of audio of the message transitioning from one speaker on the device 120 to a speaker on the handset. Alternatively or additionally, in some embodiments, picking up the handset of the device 120 may result in directing a new communication session request to another device and/or allowing a user to enter a destination for a communication session request (e.g., by entering a telephone number, a user name, an email address, etc.). In these and other embodiments, picking up the handset may include a notification that the handset has been picked up which may be an indication to terminate the network connection between the device 120 and the remote transcription system 130.

Alternatively or additionally, in some embodiments, the indication to terminate the network connection may include a notification that the device is receiving an incoming communication request, a notification that the device is sending an outgoing communication request, and/or a notification that the device has accepted an incoming communication request. For example, in some embodiments, the device 120 may obtain a communication request from a second device. In response to the communication request, a network connection may be established between the device 120 and the second device. In some embodiments, the network connection between the device 120 and the second device may be a different type of network connection than the network connection between the device 120 and the remote transcription system 130. For example, the network connection between the device 120 and the second device may be a POTS or VOIP network connection while the network connection between the device 120 and the remote transcription system 130 may be a TCP network connection. Establishing the network connection between the device 120 and the second device may be the indication to terminate the network connection between the device 120 and the remote transcription system 130. The network connection between the device 120 and the remote transcription system 130 may be terminated and another network connection between the device 120 and the remote transcription system 130 may be established for the communication session between the device 120 and the second device.

Alternatively, in some embodiments, the device 120 may obtain a communication request from a second device. In response to the communication request, a network connection may be established between the device 120 and the second device as a communication session. The device 120 may direct audio of the communication session to the remote transcription system 130 over the network connection and the device 120 may obtain transcriptions of the audio of the communication session from the remote transcription system 130 over the network connection. For example, when the remote transcription system 130 includes an individual who re-voices audio, the same individual may re-voice the audio of one or more messages and the audio of the communication session. At some point, the network connection between the device 120 and the second device, i.e. the communication session, may be terminated. For example, a user of the device 120 or a user of the second device may terminate the communication session. The termination of the network connection between the device 120 and the second device may be the indication to terminate the network connection between the device 120 and the remote transcription system 130. In some embodiments, the device 120 may provide a notification to the remote transcription system 130 that the network connection between the device 120 and the second device has terminated.

Alternatively or additionally, in some embodiments, the indication to terminate the network connection may include a notification that the device 120 has been idle for a duration of time. For example, in some embodiments, the duration of time may be ten seconds, thirty seconds, one minute, two minutes, or any other duration of time. In some embodiments, the remote transcription system 130 may track the duration of time that the device 120 has been idle. The remote transcription system 130 may determine that the device 120 is idle based on not receiving data from the device 120 via the network 110. Alternatively or additionally, in some embodiments, the device 120 may track the duration of time that the device 120 has been idle. The device 120 may determine that the device 120 is idle based on not receiving input from an input device such as a mouse, keyboard, touchscreen, buttons on the device 120 and/or other forms of input.

Modifications, additions, or omissions may be made to the environment 100 without departing from the scope of the present disclosure. For example, in some embodiments, the environment 100 may include a second device communicatively coupled with the network 110. Alternately or additionally, the remote transcription system 130 may be distributed across multiple devices.

Figure 2:
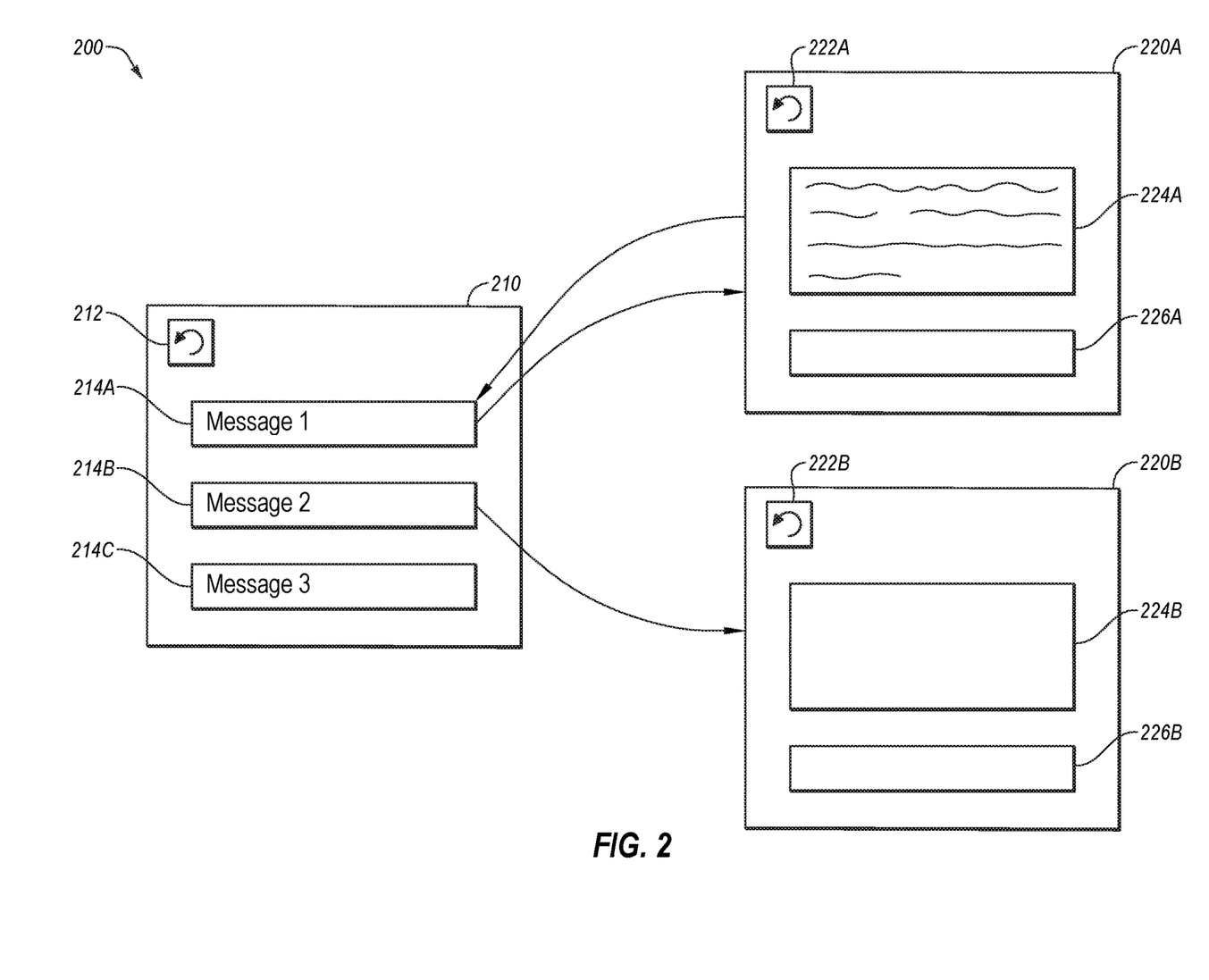
FIG. 2 illustrates a message and transcription user interface.

FIG. 2 illustrates a message and transcription user interface 200. The message and transcription user interface 200 may include a message list window 210, a first message transcription window 220A, and a second message transcription window 220B. In some embodiments, the message and transcription user interface 200 may be associated with a device such as the device 120 of FIG. 1. In these and other embodiments, the message and transcription user interface 200 may be presented on a display of the device.

The message list window 210 may include a back button 212, the message 1 214A, the message 2 214B, and the message 3 214C (collectively the list of messages 214 or the messages 214). In some embodiments, in response to obtaining input selecting the back button 212, the message list window 210 may close and the device may present a different menu on the display. In some embodiments, if a network connection between the device and a remote transcription system is open, the closing of the message list window 210 and/or obtaining input selecting the back button 212 may be an indication to the device and/or the remote transcription system to terminate the network connection. The messages 214 may include each message associated with the device. In some embodiments, the message list window 210 may include a scroll bar to scroll through the messages 214. Alternatively or additionally, in some embodiments, the message list window 210 may scroll up and/or down in response to the device receiving input such as touch input scrolling up or down. In some embodiments, the messages 214 may include details about the messages 214. For example, in some embodiments, each of the messages 214 may include a sender of the message, a time the message was received, a length of the message, whether the message has been played back, and/or other information about the message.

In response to obtaining input selecting the message 1 214A, the first message transcription window 220A may be presented on the display of the device. Alternatively or additionally, in some embodiments, in response to obtaining input selecting the message 1 214A, a network connection may be established between the device and a remote transcription system such as the remote transcription system 130 of FIG. 1. In some embodiments, the first message transcription window 220A may include a back button 222A, a transcription text box 224A, and an additional information box 226A. In some embodiments, in response to obtaining input selecting the back button 222A, the first message transcription window 220A may close and the device may present a different menu on the display, such as the message list window 210. In some embodiments, the network connection between the device and the remote transcription system may not be terminated in response to closing the first message transcription window 220A or in response to obtaining input selecting the back button 222A but instead the network connection may be maintained.

In some embodiments, the transcription text box 224A may include the text of the transcription of the message 1 214A. In some embodiments, the lines of text in the transcription text box 224A may be generated by a remote transcription system such as the remote transcription system 130 of FIG. 1. The text in the transcription text box 224A may correspond with the words of the speech of the audio in the message 214A. In these and other embodiments, the text of the transcription of the message 1 214A may be displayed as it is obtained from the remote transcription system. In some embodiments, the text in the transcription text box 224A may include highlighting, underlining, italicizing, bolding, increasing a font size, or other alterations to the formatting of the text.

In some embodiments, the additional information box 226A may include additional information about the message 1 214A. For example, in some embodiments, the additional information box 226A may include a sender of the message 1 214A, a time the message 1 214A was received, a length of the message 1 214A, and/or other information about the message 1 214A. Alternatively or additionally, in some embodiments, the additional information box 226A may include an input field. In these and other embodiments, a user may input comments and/or feedback about the transcription of the message 1 214A into the additional information box 226A and the comments and/or feedback may be provided to the remote transcription system to improve the quality of the generated transcriptions.

In response to obtaining input selecting the message 2 214B, the second message transcription window 220B may be presented on the display of the device. Alternatively or additionally, in some embodiments, in response to obtaining input selecting the message 2 214B, a network connection may be established between the device and a remote transcription system such as the remote transcription system 130 of FIG. 1 if there is currently no network connection between the device and the remote transcription system. Alternatively or additionally, in some embodiments, in response to obtaining input selecting the message 2 214B, if there is currently an existing network connection between the device and the remote transcription system, the network connection may maintained and the existing network connection may be used to obtain transcriptions from the remote transcription system. In some embodiments, the second message transcription window 220B may include a back button 222B, a transcription text box 224B, and an additional information box 226B. In some embodiments, in response to obtaining input selecting the back button 222B, the second message transcription window 220B may close and the device may present a different menu on the display, such as the message list window 210.

In some embodiments, the transcription text box 224B may include the text of the transcription of the message 2 214B. In some embodiments, the transcription text box 224B may be empty when the message 2 214B is initially selected, even if a different message, such as the message 1 214A has previously been selected and has transcriptions as illustrated in transcription text box 224A. In some embodiments, lines of text in the transcription text box 224B may be generated in a manner similar to that discussed above with reference to the transcription text box 224A. In some embodiments, the additional information box 226B may be similar to the additional information box 226A discussed above.

In some embodiments, each of the message list window 210, the first message transcription window 220A, and the second message transcription window 220B may be displayed in a stacked manner. For example, each of the first message transcription window 220A and the second message transcription window 220B may cover or substantially cover the message list window 210. In these and other embodiments, each of the first message transcription window 220A, the second message transcription window 220B, and the message list window 210 may occupy or substantially occupy the display of the device. Alternatively or additionally, in some embodiments, the message list window 210, the first message transcription window 220A, and the second message transcription window 220B may be presented such that each of the message list window 210, the first message transcription window 220A, and the second message transcription window 220B may be viewed simultaneously on a display of the device.

Modifications, additions, or omissions may be made to the message and transcription user interface 200 without departing from the scope of the present disclosure. For example, in some embodiments, the message list window 210, the first message transcription window 220A, and the second message transcription window 220B may include additional buttons. Alternatively or additionally, in some embodiments, the first message transcription window 220A and the second message transcription window 220B may not include the additional information box 226A and the additional information box 226B, respectively.

Figure 3:
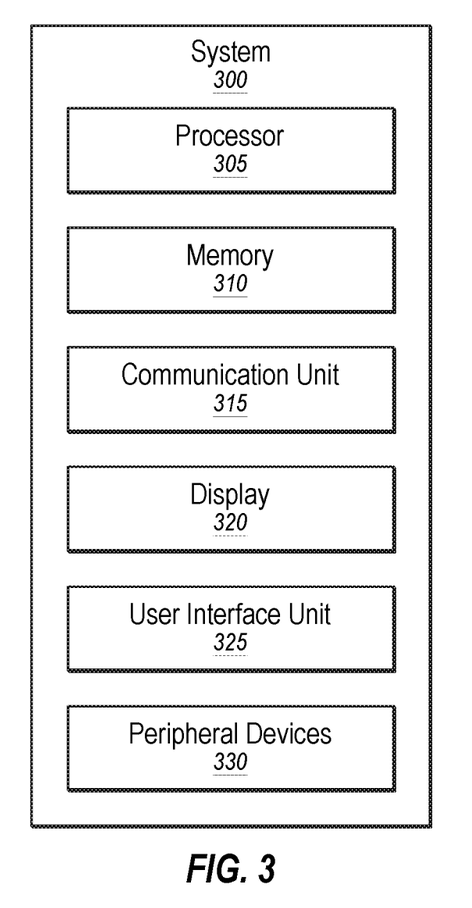
FIG. 3 illustrates an example communication device that may be used to maintain network connections.

FIG. 3 illustrates an example communication device 300 that may be used in maintaining network connections. The communication device 300 may be arranged in accordance with at least one embodiment described in the present disclosure. The communication device 300 may include a processor 305, a memory 310, a communication unit 315, a display 320, a user interface unit 325, and peripheral devices 330, which all may be communicatively coupled. In some embodiments, the communication device 300 may be part of any of the systems or devices described in this disclosure. For example, the communication device 300 may be part of any of the device 120 and the remote transcription system 130 of FIG. 1. In some embodiments, the communication device 300 may be part of a phone console.

Generally, the processor 305 may include any suitable special-purpose or general-purpose computer, computing entity, or processing device including various computer hardware or software modules and may be configured to execute instructions stored on any applicable computer-readable storage media. For example, the processor 305 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 3, it is understood that the processor 305 may include any number of processors distributed across any number of networks or physical locations that are configured to perform individually or collectively any number of operations described herein. In some embodiments, the operations may be stored as program instructions loaded into the memory 310. In these and other embodiments, the processor 305 may interpret and/or execute program instructions and/or process data stored in the memory 310. In these and other embodiments, the program instructions may include the processor 305 maintaining a network connection between a device and a remote transcription system.

The memory 310 may include computer-readable storage media for carrying or having computer-executable instructions or data structures stored thereon. Such computer-readable storage media may be any available media that may be accessed by a general-purpose or special-purpose computer, such as the processor 305. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 305 to perform a certain operation or group of operations, such as one or more blocks of the method 400 of FIG. 4 or one or more blocks of the method 500 of FIG. 5. Alternatively or additionally, in some embodiments, the instructions may be configured to cause the processor 305 to perform the operations of the environment 100 of FIG. 1 to maintain network connections. In these and other embodiments, the processor 305 may be configured to execute instructions to maintain network connections.

The communication unit 315 may include any component, device, system, or combination thereof that is configured to transmit or receive information over a network. In some embodiments, the communication unit 315 may communicate with other devices at other locations, the same location, or even other components within the same system. For example, the communication unit 315 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 315 may permit data to be exchanged with a network and/or any other devices or systems described in the present disclosure.

The display 320 may be configured as one or more displays, like an LCD, LED, or other type of display. The display 320 may be configured to present video, text transcriptions, user interfaces, and other data as directed by the processor 305.

The user interface unit 325 may include any device to allow a user to interface with the communication device 300. For example, the user interface unit 325 may include a mouse, a track pad, a keyboard, a touchscreen, a telephone switch hook, a telephone keypad, volume controls, and/or other special purpose buttons, among other devices. The user interface unit 325 may receive input from a user and provide the input to the processor 305.

The peripheral devices 330 may include one or more devices. For example, the peripheral devices may include a microphone, a camera, and/or a speaker, among other peripheral devices. In these and other embodiments, the microphone may be configured to capture audio. The imager may be configured to capture digital images. The digital images may be captured in a manner to produce video or image data. In some embodiments, the speaker may play audio received by the communication device 300 or otherwise generated by the communication device 300.

Modifications, additions, or omissions may be made to the communication device 300 without departing from the scope of the present disclosure.

Figure 4:
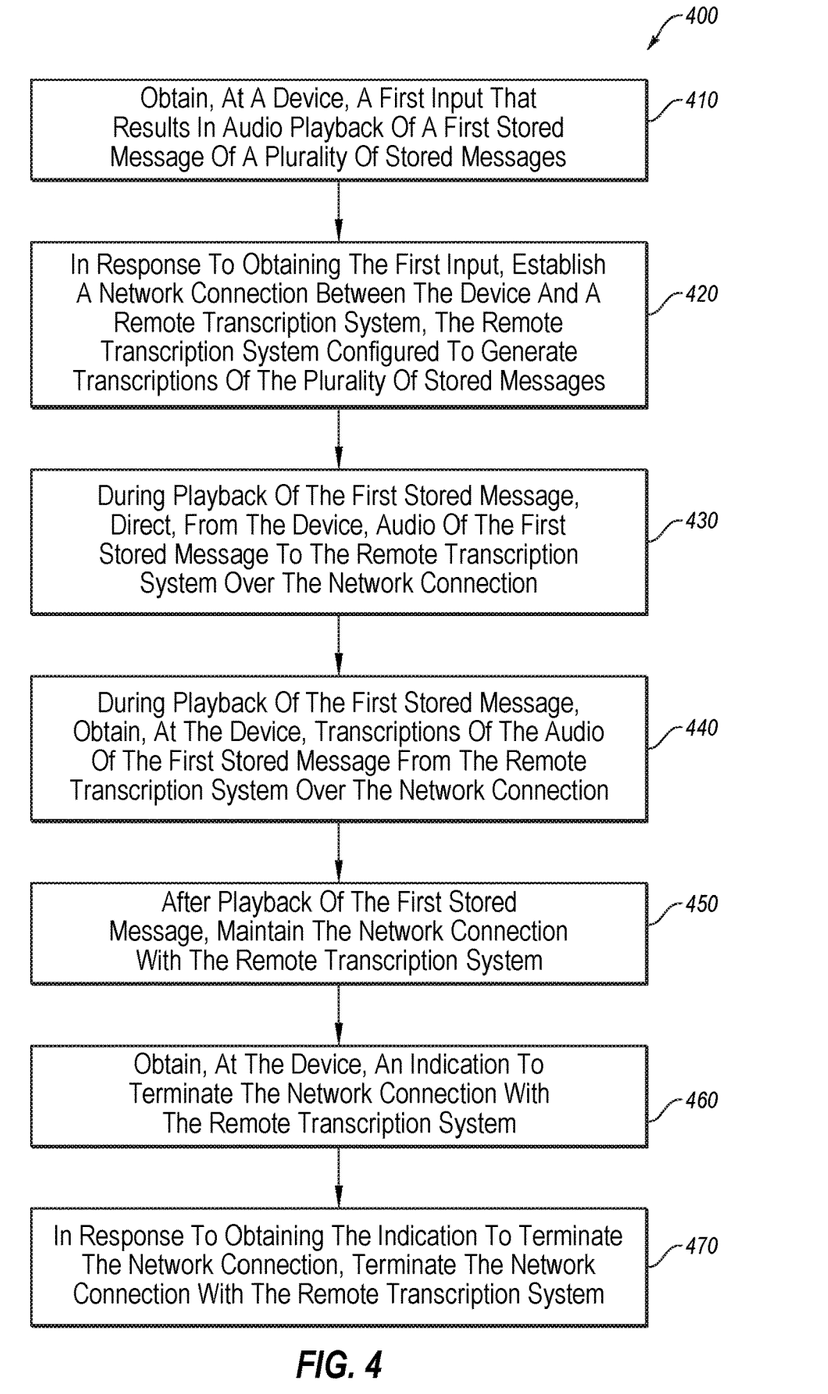
FIG. 4 is a flowchart of an example computer-implemented method to maintain network connections.

FIG. 4 is a flowchart of an example computer-implemented method to maintain network connections. The method 400 may be arranged in accordance with at least one embodiment described in the present disclosure. The method 400 may be performed, in whole or in part, in some embodiments, by a system and/or environment, such as the environment 100 and/or the communication device 300 of FIGS. 1 and 3, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 410, where a first input that results in audio playback of a first stored message of a plurality of stored messages may be obtained at a device. In block 420, a network connection may be established between the device and a remote transcription system in response to obtaining the first input. The network connection may include a TCP network connection. The remote transcription system may be configured to generate transcriptions of the plurality of stored messages.

In block 430, audio of the first stored message may be directed from the device to the remote transcription system over the network connection during playback of the first stored message. In block 440, transcriptions of the audio of the first stored message may be obtained at the device from the remote transcription system over the network connection during playback of the first stored message.

In block 450, the network connection with the remote transcription system may be maintained after playback of the first stored message. In block 460, an indication to terminate the network connection with the remote transcription system may be obtained at the device. In some embodiments, the indication to terminate the network connection may include a menu selection at the device navigating to a different menu than a stored message playback menu; a notification that a handset of the device has been picked up; a notification that the device is receiving an incoming communication request; or a notification that the device has accepted an incoming communication request. Alternatively or additionally, in some embodiments, the indication to terminate the network connection may be obtained from the remote transcription system and the indication may include a notification that the device has been idle for a duration of time. In block 470, the network connection with the remote transcription system may be terminated in response to obtaining the indication to terminate the network connection.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks. For example, in some embodiments, the method 400 may include obtaining, at the device, a second input that results in audio playback of a second stored message of the plurality of stored messages. The method 400 may include directing, from the device, audio of the second stored message to the remote transcription system over the network connection during playback of the second stored message.

The method 400 may include obtaining, at the device, transcriptions of the audio of the second stored message from the remote transcription system over the network connection during playback of the second stored message. In these and other embodiments, the indication to terminate the network connection may be obtained during playback of the second stored message and the network connection may be terminated prior to completion of playback of the second stored message.

Alternatively or additionally, in some embodiments, the method 400 may include obtaining, from a second device, a communication request. The method 400 may include establishing a second network connection between the device and the second device in response to the communication request. The second network connection may be a different type of network connection than the network connection described above with reference to block 420. For example, the second network connection may be a POTS connection. Alternatively or additionally, in some embodiments, the second network connection may be the same type of network connection as the network connection described above with reference to block 420. The establishing the second network connection may be the indication to terminate the network connection with the remote transcription system. The method 400 may include establishing a third network connection between the device and the remote transcription system after terminating the network connection with the remote transcription system. In some embodiments, the third network connection may be the same type of network connection as the network connection described above with reference to block 420. For example, the third network connection may be a TCP network connection. Alternatively or additionally, in some embodiments, the third network connection may be a different type of network connection.

Alternatively or additionally, in some embodiments, the method 400 may include obtaining, from a second device, a communication request. The method 400 may include establishing a second network connection between the device and the second device as a communication session in response to the communication request. The second network connection may be a different type of network connection than the network connection described above with reference to block 420. For example, the second network connection may be a POTS connection. Alternatively or additionally, in some embodiments, the second network connection may be the same type of network connection as the network connection described above with reference to block 420. The method 400 may include directing, from the device, audio of the communication session to the remote transcription system over the network communication during the communication session. The method 400 may include obtaining, at the device, transcriptions of the audio of the communication session from the remote transcription system over the network connection during the communication session. The method 400 may include terminating the second network connection with the second device. In these and other embodiments, the terminating the second network connection may be the indication to terminate the network connection with the remote transcription system.

Figure 5:
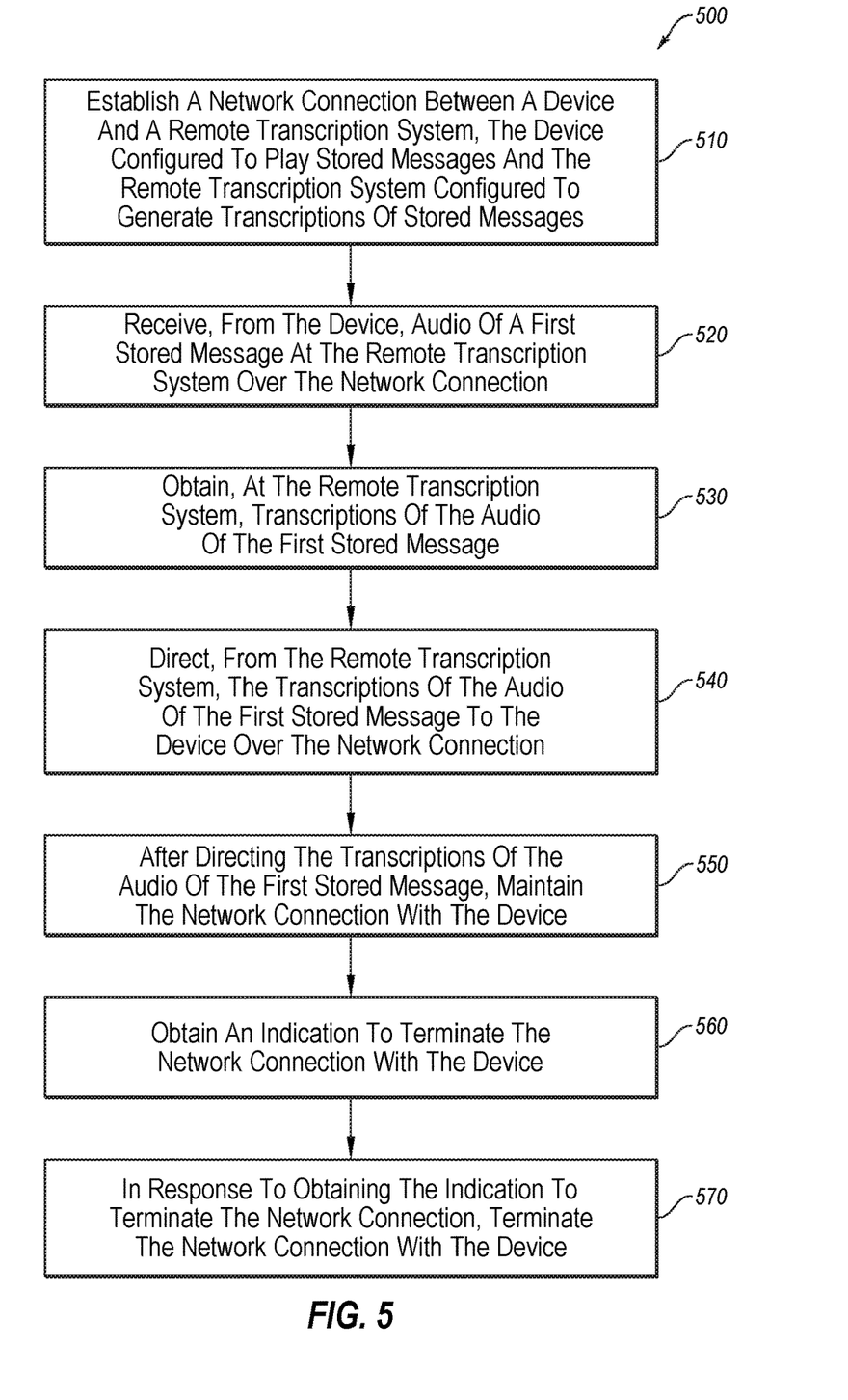
FIG. 5 is a flowchart of another example computer-implemented method to maintain network connections.

FIG. 5 is a flowchart of an example computer-implemented method to maintain network connections. The method 500 may be arranged in accordance with at least one embodiment described in the present disclosure. The method 500 may be performed, in whole or in part, in some embodiments, by a system and/or environment, such as the environment 100 and/or the communication device 300 of FIGS. 1 and 3, respectively. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 510, where a network connection may be established between a device and a remote transcription system. The device may be configured to play stored messages. The remote transcription system may be configured to generate transcriptions of stored messages. In block 520, audio of a first stored message may be received from the device at the remote transcription system over the network connection.

In block 530, transcriptions of the audio of the first stored message may be obtained at the remote transcription system. In block 540, the transcriptions of the audio of the first stored message may be directed from the remote transcription system to the device over the network connection.

In block 550, the network connection with the device may be maintained after directing the transcriptions of the audio of the first stored message. In block 560, an indication to terminate the network connection with the device may be obtained. In some embodiments, the indication to terminate the network connection may include a notification that the device has been idle for a duration of time. In these and other embodiments, the notification that the device has been idle for the duration of time may be obtained from the remote transcription system. Alternatively or additionally, in these and other embodiments, the notification that the device has been idle for the duration of time may be obtained from the device. In some embodiments, the indication to terminate the network connection may be obtained from the device and the indication may include a menu selection at the device navigating to a different menu than a stored message playback menu; a notification that a handset of the device has been picked up; a notification that the device is receiving an incoming communication request; or a notification that the device has accepted an incoming communication request. In block 570, the network connection with the device may be terminated in response to obtaining the indication to terminate the network connection.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 500 may include additional blocks. For example, in some embodiments, the method 500 may include receiving, from the device, audio of a communication request between the device and a second device at the remote transcription system over the network connection. The method 500 may include obtaining, at the remote transcription system, transcriptions of the audio of the communication request. The method 500 may include directing, from the remote transcription system, the transcriptions of the audio of the communication request to the device over the network connection. The method 500 may include receiving, from the device, a notification that the communication request between the device and the second device has terminated. In these and other embodiments, the notification that the communication request between the device and the second device has terminated may be the indication to terminate the network connection with the device.

As indicated above, the embodiments described herein may include the use of a special purpose or general purpose computer (e.g., the processor 305 of FIG. 3) including various computer hardware or software modules. Further, as indicated above, embodiments described herein may be implemented using computer-readable media (e.g., the memory 310 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining, at a device, a first input that results in audio playback of a first stored message of a plurality of stored messages;
   in response to obtaining the first input, establishing a network connection between the device and a remote transcription system, the remote transcription system configured to generate transcriptions of the plurality of stored messages;
   during playback of the first stored message, directing, from the device, audio of the first stored message to the remote transcription system over the network connection;
   during playback of the first stored message, obtaining, at the device, transcriptions of the audio of the first stored message from the remote transcription system over the network connection;
   after playback of the first stored message, maintaining the network connection with the remote transcription system;
   obtaining, at the device, a second input that results in audio playback of a second stored message of the plurality of stored messages;
   during playback of the second stored message, directing, from the device, audio of the second stored message to the remote transcription system over the network connection;
   during playback of the second stored message, obtaining, at the device, transcriptions of the audio of the second stored message from the remote transcription system over the network connection;
   obtaining an indication to terminate the network connection with the remote transcription system; and
   in response to obtaining the indication to terminate the network connection, terminating the network connection with the remote transcription system.

2. The method of claim 1, wherein the indication to terminate the network connection includes: a menu selection at the device navigating to a different menu than a stored message playback menu; a notification that a handset of the device has been picked up; a notification that the device is receiving an incoming communication request; or a notification that the device has accepted an incoming communication request.

3. The method of claim 1, wherein obtaining the indication to terminate the network connection includes obtaining, from the remote transcription system, the indication to terminate the network connection and wherein the indication includes a notification that the device has been idle for a duration of time.

4. The method of claim 1, wherein the indication to terminate the network connection is obtained during playback of the second stored message and wherein the network connection is terminated prior to completion of playback of the second stored message.

5. The method of claim 1, further comprising:
   obtaining, from a second device, a communication request;
   in response to the communication request, establishing a second network connection between the device and the second device, the establishing the second network connection being the indication to terminate the network connection with the remote transcription system; and
   after terminating the network connection with the remote transcription system, establishing a third network connection between the device and the remote transcription system.

6. The method of claim 1, further comprising:
   obtaining, from a second device, a communication request;
   in response to the communication request, establishing a second network connection between the device and the second device as a communication session;
   during the communication session, directing, from the device, audio of the communication session to the remote transcription system over the network connection;
   during the communication session, obtaining, at the device, transcriptions of the audio of the communication session from the remote transcription system over the network connection; and
   terminating the second network connection with the second device,
   wherein the terminating the second network connection is the indication to terminate the network connection with the remote transcription system.

7. At least one non-transitory computer readable medium configured to store one or more instructions that when executed by at least one system perform the method of claim 1.

8. A method comprising:
   obtaining, at a device, a first input that results in audio playback of a first stored message of a plurality of stored messages;

in response to obtaining the first input, establishing a network connection between the device and a remote transcription system, the remote transcription system configured to generate transcriptions of the plurality of stored messages;

during playback of the first stored message, directing, from the device, audio of the first stored message to the remote transcription system over the network connection;

during playback of the first stored message, obtaining, at the device, transcriptions of the audio of the first stored message from the remote transcription system over the network connection;

after playback of the first stored message, maintaining the network connection with the remote transcription system;

obtaining, at the device, an indication to terminate the network connection with the remote transcription system; and in response to obtaining the indication to terminate the network connection, terminating the network connection with the remote transcription system.

9. The method of claim 8, wherein the indication to terminate the network connection includes: a menu selection at the device navigating to a different menu than a stored message playback menu; a notification that a handset of the device has been picked up; a notification that the device is receiving an incoming communication request; or a notification that the device has accepted an incoming communication request.

10. The method of claim 8, wherein obtaining the indication to terminate the network connection includes obtaining, from the remote transcription system, the indication to terminate the network connection and wherein the indication includes a notification that the device has been idle for a duration of time.

11. The method of claim 8, further comprising:
obtaining, from a second device, a communication request;
in response to the communication request, establishing a second network connection between the device and the second device, the establishing the second network connection being the indication to terminate the network connection with the remote transcription system; and
after terminating the network connection with the remote transcription system, establishing a third network connection between the device and the remote transcription system.

12. The method of claim 8, further comprising:
obtaining, from a second device, a communication request;
in response to the communication request, establishing a second network connection between the device and the second device as a communication session;
during the communication session, directing, from the device, audio of the communication session to the remote transcription system over the network connection;
during the communication session, obtaining, at the device, transcriptions of the audio of the communication session from the remote transcription system over the network connection; and
terminating the second network connection with the second device, wherein the terminating the second network connection is the indication to terminate the network connection with the remote transcription system.

13. At least one non-transitory computer readable medium configured to store one or more instructions that when executed by at least one system perform the method of claim 8.

14. A method comprising:
establishing a network connection between a device and a remote transcription system, the device configured to play stored messages and the remote transcription system configured to generate transcriptions of stored messages;
receiving, from the device, audio of a first stored message at the remote transcription system over the network connection;
obtaining, at the remote transcription system, transcriptions of the audio of the first stored message;
directing, from the remote transcription system, the transcriptions of the audio of the first stored message to the device over the network connection;
after directing the transcriptions of the audio of the first stored message, maintaining the network connection with the device;
obtaining an indication to terminate the network connection with the device; and
in response to obtaining the indication to terminate the network connection, terminating the network connection with the device.

15. The method of claim 14, wherein obtaining the indication to terminate the network connection includes obtaining, from the device, the indication to terminate the network connection and wherein the indication includes: a menu selection at the device navigating to a different menu than a stored message playback menu; a notification that a handset of the device has been picked up; a notification that the device is receiving an incoming communication request; or a notification that the device has accepted an incoming communication request.

16. The method of claim 14, wherein the indication to terminate the network connection includes: a notification that the device has been idle for a duration of time.

17. The method of claim 16, wherein obtaining the indication to terminate the network connection with the device includes obtaining, from the remote transcription system, the notification that the device has been idle for the duration of time as the indication to terminate the network connection.

18. The method of claim 16, wherein obtaining the indication to terminate the network connection with the device includes obtaining, from the device, the notification that the device has been idle for the duration of time as the indication to terminate the network connection.

19. The method of claim 14, further comprising:
receiving, from the device, audio of a communication request between the device and a second device at the remote transcription system over the network connection;
obtaining, at the remote transcription system, transcriptions of the audio of the communication request;
directing, from the remote transcription system, the transcriptions of the audio of the communication request to the device over the network connection; and
receiving, from the device, a notification that the communication request between the device and the second device has terminated, wherein the notification that the communication request between the device and the second device has terminated is the indication to terminate the network connection with the device.

20. At least one non-transitory computer readable medium configured to store one or more instructions that when executed by at least one system perform the method of claim 14.

* * * * *